United States Patent
Sun et al.

(10) Patent No.: US 11,297,010 B2
(45) Date of Patent: Apr. 5, 2022

(54) IN-LINE DATA OPERATIONS FOR STORAGE SYSTEMS

(71) Applicant: Western Digital Technologies, Inc., San Jose, CA (US)

(72) Inventors: Chao Sun, San Jose, CA (US); Pietro Bressana, Lugano (CH); Dejan Vucinic, San Jose, CA (US); Huynh Tu Dang, Milpitas, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 32 days.

(21) Appl. No.: 16/725,824

(22) Filed: Dec. 23, 2019

(65) Prior Publication Data

US 2021/0194830 A1  Jun. 24, 2021

(51) Int. Cl.
| | |
|---|---|
| *H04L 12/939* | (2013.01) |
| *H04L 12/26* | (2006.01) |
| *H04L 12/931* | (2013.01) |
| *H04L 29/06* | (2006.01) |
| *H04L 29/08* | (2006.01) |
| *H04L 49/55* | (2022.01) |
| *H04L 49/356* | (2022.01) |
| *H04L 69/22* | (2022.01) |
| *H04L 67/1097* | (2022.01) |
| *H04L 43/067* | (2022.01) |

(52) U.S. Cl.
CPC .......... *H04L 49/555* (2013.01); *H04L 43/067* (2013.01); *H04L 49/356* (2013.01); *H04L 67/1097* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 7,554,984 B2 * | 6/2009 | Kalkunte | H04L 49/602 370/392 |
| 9,152,580 B1 * | 10/2015 | Chau | G06F 13/00 |
| 9,164,890 B2 * | 10/2015 | Shin | G06F 3/0679 |
| 9,558,124 B2 * | 1/2017 | Moon | G06F 3/0607 |
| 9,639,287 B1 * | 5/2017 | Malina | G06F 3/0659 |
| 10,325,108 B2 * | 6/2019 | Li | G06F 21/52 |
| 10,412,002 B1 | 9/2019 | Richardson et al. | |

(Continued)

OTHER PUBLICATIONS

Pending U.S. Appl. No. 16/724,226, filed Dec. 21, 2019, entitled "In-Line Data Identification on Network", Sun et al.

*Primary Examiner* — Tri H Phan
(74) *Attorney, Agent, or Firm* — Barry IP Law, P.C.

(57) ABSTRACT

A programmable network switch includes at least one pipeline including a packet parser configured to parse packets received by the programmable network switch. The programmable network switch further includes a plurality of ports for communication with a plurality of Data Storage Devices (DSDs). Packets comprising commands are received by the programmable network switch to perform at least one of retrieving data from and storing data in the plurality of DSDs. The commands are sent by the programmable network switch to the plurality of DSDs via the plurality of ports, and the use of each port for sending the commands is monitored. According to one aspect, it is determined which port to use to send a command based on the monitored use of at least one port of the plurality of ports.

20 Claims, 4 Drawing Sheets

(56) References Cited

U.S. PATENT DOCUMENTS

| | | | | |
|---|---|---|---|---|
| 10,474,397 B2* | 11/2019 | Lamberts | ................ | G06F 3/068 |
| 10,678,724 B1* | 6/2020 | ChoFleming | ....... | H04L 67/1097 |
| 10,860,231 B2* | 12/2020 | Byun | .................... | G06F 3/0604 |
| 11,200,961 B1* | 12/2021 | Uribe | ..................... | G11C 29/44 |
| 2020/0136996 A1 | 4/2020 | Li et al. | | |
| 2020/0409559 A1* | 12/2020 | Sharon | ................. | G06F 3/0608 |
| 2021/0303206 A1* | 9/2021 | Saxena | ................ | G06F 3/0679 |

\* cited by examiner

IN-LINE DATA OPERATIONS FOR STORAGE SYSTEMS

BACKGROUND

Data storage systems can be used, for example, in data centers to provide cloud storage, big data analysis, or distributed Machine Learning (ML) applications. In such data storage systems, a large number of Data Storage Devices (DSDs) may communicate on a network using switches or hubs that route data requests to store data in the DSDs or to retrieve data from the DSDs. Each DSD or group of DSDs may have a dedicated controller or server for performing certain operations. Such operations can include in-line operations that are performed while data is in the process of being retrieved or stored from the point of view of a client that issued the data request. However, with the emergence of high-performance networking (e.g., 100 Gb/s per link and 6.4 Tbit/s aggregate throughput) using Software Defined Networking (SDN), such in-line operations performed by a storage controller or server can become the bottleneck in performing data requests.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Examples

Figure 1A:
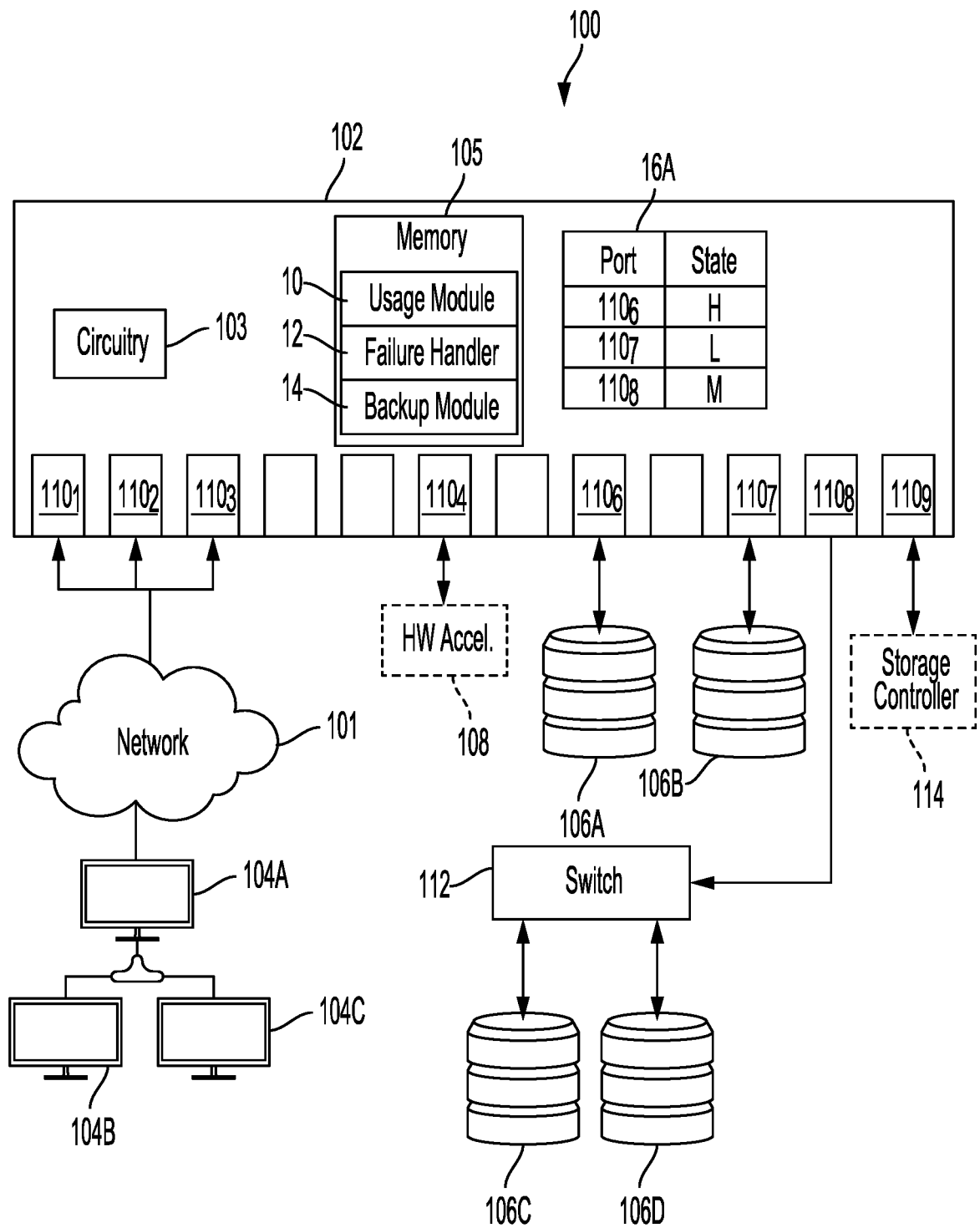
FIG. 1A illustrates an example system for in-line monitoring of port usage according to one or more embodiments.

FIG. 1A illustrates an example system 100 for implementing in-line port monitoring according to one or more embodiments. As shown in FIG. 1A, clients 104A, 104B, and 104C are in communication with programmable network switch 102 via network 101, which connects to ports 1101, 1102, and 1103 of programmable network switch 102. Data Storage Devices (DSDs) 106A, 106B, 106C, and 106D are in communication with programmable network switch 102 via ports 1106, 1107, and 1108. In addition, optional hardware accelerator 108 is in communication with programmable network switch 102 via port 1104. As discussed in more detail below, the use of hardware accelerator 108 with programmable network switch 102 is optional, and other implementations may not include a hardware accelerator in system 100. In the example of FIG. 1A, optional storage controller 114 communicates with programmable network switch 102 via port 1109.

Clients 104A to 104C include electronic devices that use DSDs 106A to 106D for external data storage. For example, clients 104A to 104C can include computing devices, embedded devices, desktops, laptops or notebook computers or another type of electronic device such as a tablet, smartphone, network media player, portable media player, television, digital camera, or Digital Video Recorder (DVR). In some implementations, the portion of system 100 excluding network 101 and clients 104A to 104C may be used as part of a data center, such as for cloud storage, distributed Machine Learning (ML), or big data analysis.

Network 101 connecting clients 104A to 104C can include, for example, a Local Area Network (LAN) and/or a Wide Area Network (WAN), such as the Internet. In this regard, one or more of clients 104A to 104C, programmable network switch 102, and/or one or more of DSDs 106A to 106D may not be physically co-located. Clients 104A to 104C, programmable network switch 102, and DSDs 106A to 106D may communicate using one or more standards such as, for example, Ethernet, Fibre Channel, and/or InifiniBand. Additionally, various "over fabric" type command protocols such as NVMoF have been developed, enabling devices to communicate over the aforementioned standards of communication. In some implementations, clients 104A to 104C on network 101 may communicate using a different standard than DSDs 106A to 106D, which may form part of a Storage Area Network (SAN) or LAN apart from network 101 for communications between programmable network switch 102 and clients 104.

As shown in the example of FIG. 1, optional hardware accelerator 108 is connected to port 1104 of programmable network switch 102. Hardware accelerator 108 can provide processing and/or memory resources, such as for generating or calculating all or part of a unique identifier or fingerprint for identifying data or for filtering messages received from network 101 for security purposes. Examples of the use of hardware accelerators by a programmable network switch can be found in co-pending U.S. application Ser. No. 16/724,226, entitled "IN-LINE DATA IDENTIFICATION ON NETWORK", filed on Dec. 21, 2019, the entire contents of which are hereby incorporated by reference. In some implementations, hardware accelerator 108 can include, for example, one or more Field Programmable Gate Arrays (FPGAs), Graphics Processing Units (GPUs), or other circuitry that serves as a processing and/or memory offload for programmable network switch 102. Programmable network switch 102 and hardware accelerator 108 may communicate using a standard, such as Ethernet, Fibre Channel, InifiniBand, or Peripheral Component Interconnect express (PCIe), for example.

DSDs 106A to 106D can include, for example, one or more rotating magnetic disks in the case of a Hard Disk Drive (HDD), or non-volatile solid-state memory, such as flash memory or Storage Class Memory (SCM), in the case of a Solid-State Drive (SSD). In some examples, DSDs 106A, 106B, 106C, and/or 106D may include different types of storage media, such as in the case of a Solid-State Hybrid Drive (SSHD) that includes both a rotating magnetic disk and a solid-state memory. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., Single-Level Cell (SLC) memory, Multi-Level Cell (MLC) memory (i.e., two or more levels), or any combination thereof), NOR memory, EEPROM, Ferroelectric Memory (FeRAM), Magnetoresistive RAM (MRAM), other discrete Non-Volatile Memory (NVM) chips, or any combination thereof.

Programmable network switch 102 routes messages or packets, such as read and write commands for data, between clients 104 and DSDs 106. The use of the term "read command" herein can refer to the message or packet received by the programmable network switch to retrieve data from a DSD. Similarly, the use of the term "write command" herein can refer to the message or packet received by the programmable network switch to store data in a DSD. As discussed in more detail below, programmable network switch 102 monitors the use of ports 1106 to 1108 for sending write commands and/or read commands to DSDs 106A to 106D. Indications of the monitored use of the ports can be stored as usage data 16A. In some implementations, usage data 16A may be stored in programmable network switch 102 or in a hardware accelerator 108.

In the example of FIG. 1A, port 1108 of programmable network switch 102 is used to communicate with both DSDs 106C and 106D via switch 112, which can include a network switch or a hub in some implementations. In other words, DSDs 106C and 106D share port 1108 and the information for port 1108 in usage data 16A represents usage data for both DSDs 106C and 106D. Other implementations may track the usage of specific DSDs, rather than ports, as in the example of FIG. 1B discussed below. In such examples, programmable network switch 102 may represent DSDs 106A to 106D as a single storage device or parse a header of incoming commands to determine a network address for a particular DSD intended to receive the command.

In some cases, programmable network switch 102 may perform in-line load balancing by determining which port or DSD to send a command (i.e., a write command or a read command) based on the monitored use of at least one port. For example, programmable network switch 102 may determine to send a write command received from network 101 to a DSD with a lower usage, or may determine to send a read command received from network 101 to a DSD with a backup copy of the requested data if a first DSD is busy or has a high level of traffic.

In the example of FIG. 1A, usage data 16A associates each of ports 1106, 1107, and 1108 for DSDs 106A to 106D with a state or traffic level. In other implementations, usage data 16 may include different information, as in the example of FIG. 1B discussed below, where usage data 16B includes a percentage indicating an available storage capacity of each of DSDs 106A to 106D. As another example variation, usage data 16 may include information, such as an indication of a last use of a particular port or whether the port is used for more write commands than read commands.

As shown in FIG. 1A, port 1106 has a state of high traffic (i.e., H in usage data 16A), port 1107 has a state of low traffic (i.e., L in usage data 16), and port 1108 has a state of medium traffic (i.e., M in usage data 16). In some implementations, the states of each port may be periodically updated by programmable network switch 102. In more detail, circuitry 103 of programmable network switch 102 may identify received messages as write commands and/or read commands, as opposed to other types of messages received by programmable network switch 102, and track an amount of write commands and/or read commands sent via each port. The identification of write and/or read commands may be performed by parsing a payload of messages to identify instructions within the payload indicating whether the message is a read command or write command.

In this regard, programmable network switch 102 may also be configured to process different communication formats or protocols, and extract information used for monitoring usage of the ports. For example, some write commands may arrive in the form of an Ethernet packet including a header and a payload. Programmable network switch 102 can be configured to identify instructions for performing a write command in the payload that may be separate from the data to be written for the write command, and update usage data 16A accordingly.

In one example, programmable network switch 102 can be 64 port Top of Rack (ToR) P4 programmable network switch, such as a Barefoot Networks Tofino Application Specific Integrated Circuit (ASIC) with ports configured to provide 40, 60, or 100 Gigabit Ethernet (GE) frame rates. Other examples of programmable network switches that can be used as a programmable network switch in system 100 can include, for example, a Cavium Xpliant programmable network switch or a Broadcom Trident 3 programmable network switch.

A data plane of programmable network switch 102 is programmable and separate from a higher-level control plane that determines end-to-end routes for messages or packets between devices in system 100. In this regard, the control plane can be configured for different processes, such as the processes of FIGS. 2 to 5 discussed in more detail below.

By using programmable network switch 102 for performing in-line operations such as load-balancing, Quality of Service (QoS) operations, and fault handling while the data is in transit to a DSD 106, it is ordinarily possible to improve the performance of such in-line operations in terms of Input/Output Operations Per Second (IOPS), for example, as compared to using a storage controller or server to perform such operations. This can also reduce the need for additional storage controllers or servers, which can reduce a system cost. In addition, network traffic is ordinarily reduced since data does not need to be sent from programmable network switch 102 to a storage controller or server for each received message or packet to perform in-line operations, and then sent back to programmable network switch 102 from the storage controller or server for routing to a DSD.

The example of FIG. 1A includes an optional storage controller 114, which communicates with programmable network switch 102 via port 1109, and may be used in some implementations for off-line operations after data has already been stored in DSDs 106A to 106D, such as data compression, data backup, and/or data deduplication.

In the example of FIG. 1A, programmable network switch 102 includes circuitry 103 and memory 105, which can be configured using, for example, P4. Circuitry 103 can execute instructions, such as instructions from switch module 12, and can include, for example, one or more ASICs, microcontrollers, Digital Signal Processors (DSPs), FPGAs, hardwired logic, analog circuitry and/or a combination thereof.

In some implementations, circuitry 103 can include a System on a Chip (SoC), which may be combined with memory 105 or portions thereof.

Circuitry 103 and memory 105 can form one or more pipelines for receiving and processing incoming packets or messages from clients 104 via network 101, and for routing packets or messages to devices, such as DSDs 106. In some implementations, pipelines of programmable network switch 102 can provide parallel receipt and processing of packets or data in sequential stages. Each pipeline can include, for example, a parser, one or more processing stages, a traffic manager, and a deparser.

For its part, the packet parser can be configured to extract packet or message headers, packet or message payloads, and values or data from the headers and/or payloads, such as a network destination address, message type, and/or a network source address from a header, and a command type, data address, and data to be stored from a payload. As discussed in more detail below, the extracted values or data from the header and payload can be used for match-action operations performed by the processing stages of programmable network switch 102.

The processing stages can include, for example, programmable Arithmetic Logic Units (ALUs) or other circuitry (e.g., circuitry 103), and one or more memories (e.g., memory 105) that store match-action tables for matching extracted values and data, and performing different corresponding actions based on the matching or non-matching, such as the selection of a port or DSD to receive a command, the generation of an additional write command to backup data, or the resending of a command to a different DSD after determining a first command has failed or timed-out. The matches and corresponding actions are made according to predefined rules and the extracted values or data.

As shown in FIG. 1A, memory 105 stores usage module 10, failure handler 12, and backup module 14. Memory 105 may include, for example, a volatile RAM such as Dynamic RAM (DRAM), or a non-volatile RAM or other solid-state memory such as register arrays that are used by circuitry 103 to execute instructions for usage module 10, failure handler 12, backup module 14, or firmware of programmable network switch 102, and/or data used in executing such instructions, such as usage data 16A. In this regard, usage module 10, failure handler 12, or backup module 14 can include instructions for routing and/or processing messages or packets, and/or implementing processes such as those discussed with reference to FIGS. 2 to 5 below.

Usage module 10 can be used by programmable network switch 102 to monitor the usage of DSDs 106 or their respective ports. In some implementations, the usage of ports or DSDs can be monitored by tracking commands or particular types of commands, such as only write commands, that are sent using a port or are sent to a particular DSD 106. In the example of FIG. 1A, usage module 10 monitors use of ports 1106, 1107, and 1108 for DSDs 106. As shown in FIG. 1A, port 1106 for DSD 106A has a state or usage level of high (i.e., H in usage data 16A). Port 1107 for DSD 106B has a state or usage level of light (i.e., L in usage data 16A). Port 1108 for DSDs 106C and 106D has a state or usage level of medium (i.e., M in usage data 16A). Other implementations may include different information as part of usage data 16A, such as in the example of usage data 16B in FIG. 1B where usage data 16B indicates a percentage of available storage capacity for each of DSDs 106A, 106B, 106C, and 106D.

Failure handler 12 in FIG. 1A can be used by programmable network switch 102 to resend commands to a different DSD 106 when the original commands have been determined by programmable network switch 102 to have failed. The failure of a command may be determined in some implementations by the receipt of an error message from a first DSD 106 or may be determined by a timeout value being reached since the command was sent to the DSD 106. Some implementations may use hardware accelerator 108 to track the timeout values for commands sent to DSDs 106.

In addition, the use of timeout values can provide a QoS process for programmable network switch 102. For example, hardware accelerator 108 or circuitry 103 of programmable network switch 102 may time how long it takes to receive a command completion message or data returned for a read command sent to a first DSD 106. If a QoS limit or value is reached without receiving the data for the read command, programmable network switch 102 may send a new read command to a different DSD 106 that stores a copy of the requested data. In other implementations, programmable network switch 102 may mirror or duplicate read commands received from clients 104 to send to multiple DSDs storing copies of the same data. The data that reaches programmable network switch 102 first may be returned back to the client 104 that sent the read command, while later arriving data from other DSDs may be discarded or not forwarded to the client 104 by programmable network switch 102. This can shorten the time for performing read commands from the perspective of the requesting client 104.

Similarly, programmable network switch 102 may send write commands to one or more additional DSDs to shorten the latency for performing a write command from the perspective of the client 104 that sent the write command. The first write completion message received from one of the DSDs that received the write command can be forwarded back to the client 104, while later received write completion messages may be discarded or not forwarded to the client 104 by programmable network switch 102. Other implementations may not include an automatic in-line QoS operations performed by programmable network switch 102, or may only send additional commands based on QoS timeout values or as a command latency reduction for certain data or data to be stored in a particular DSD. For example, a command received from a client 104 can include a flag or other identifier, such as a logical address for the data that is in a certain logical address range, that indicates to programmable network switch 102 that the command should have a particular QoS timeout value or that one or more additional commands should be preemptively sent to other DSDs to reduce command performance latency.

In addition, backup module 14 can be used by programmable network switch 102 to automatically create backups of data by mirroring or duplicating write commands and sending the write commands to different DSDs 106. The backups can be in-line in that the backup is made while the data for the write command is in transit from the perspective of the client 104, as opposed to copying or backing up the data after it has already been stored in a first DSD 106, which would involve additional communication and processing among the DSDs 106, programmable network switch 102, and/or storage controller 114. Other implementations may not include an automatic in-line backup performed by programmable network switch 102, or may only backup certain data or data to be stored in a particular DSD. For example, a write command received from a client 104 can include a flag or other identifier, such as a logical address for the data that is in a certain logical address range, that indicates to programmable network switch 102 that the data should be backed up.

As will be appreciated by those of ordinary skill in the art, other implementations may include a different arrangement of modules for a programmable network switch. For example, other implementations may have a dedicated QoS module to determine when commands sent to DSDs 106 have timed-out or may not include separate modules for one or more of usage module 10, failure handler 12, or backup module 14.

Usage data 16A can include one or more data structures, and in some implementations, may be used by one or more processing stages of programmable network switch 102 as a match-action table in conjunction with a traffic manager to determine a port 110 to use to send a command to a DSD 106. A deparser of programmable network switch 102 can be configured to construct or reassemble a message or packet for communicating with the DSD 106 or with a client 104 in the case of sending a command completion message or read data back to the client 104.

As discussed in more detail below, the use of a programmable network switch between clients 104 and DSDs 106 allows for in-line operations (i.e., while messages are in transit between the client and DSD) without communicating with a storage controller or server. Such in-line operations performed by programmable network switch 102 can include in-line load balancing in terms of data traffic and/or storage usage, failure handling, QoS, and backups. As discussed in more detail below, performing these operations by programmable network switch 102 while commands (e.g., write commands and/or read commands) are in transit is ordinarily more efficient in terms of time and processing resources than using a dedicated server or storage controller, and/or performing such operations after the command has completed. Programmable network switch 102 also allows for a protocol-independent handling of both incoming messages and outgoing messages when communicating with devices in system 100, such as with clients 104, DSDs 106, and hardware accelerator 108. This can ordinarily allow for the expansion of system 100 with different types of DSDs or hardware accelerators 108, which may be tailored to perform different functions or store different types of data in system 100.

As will be appreciated by those of ordinary skill in the art, system 100 may include additional devices or a different number of devices than shown in the example of FIG. 1A. For example, some implementations may not include hardware accelerator 108 or storage controller 114, or may include a different number of clients 104, programmable network switches 102, or DSDs 106.

Figure 1B:
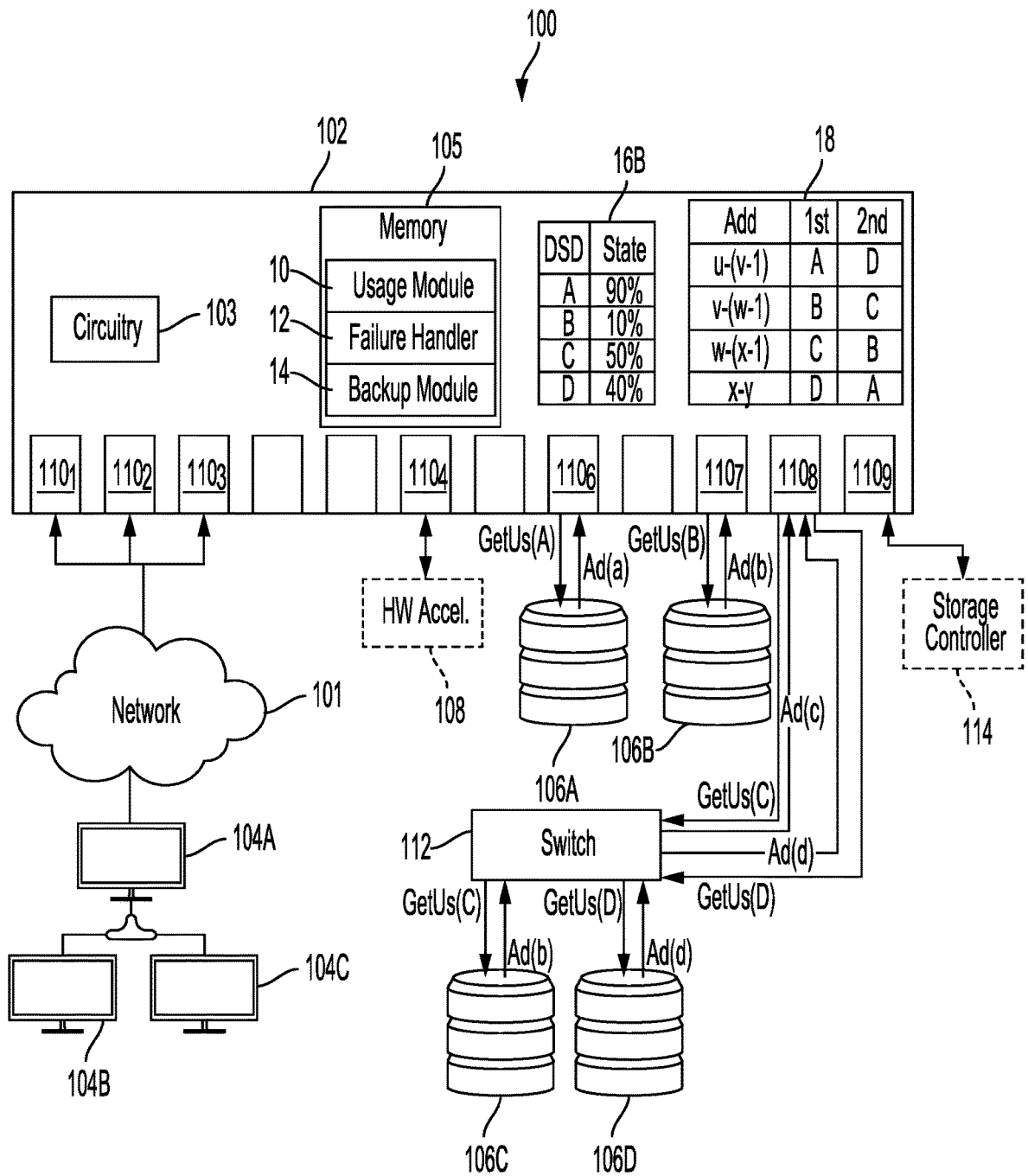
FIG. 1B illustrates an example where the programmable network switch from the system of FIG. 1A is configured to request Data Storage Device (DSD) usage and perform logical address mapping according to one or more embodiments.

FIG. 1B illustrates an example of system 100 where programmable network switch 102 is configured to request DSD usage and perform logical address mapping according to one or more embodiments. As shown in FIG. 1B, programmable network switch 102 requests a usage of each of DSDs 106A, 106B, 106C, and 106D (e.g., GetUS(A) in FIG. 1B). The usage can be a remaining or available storage capacity of the DSD 106. For example, the usage request may request a range of available addresses (e.g., Logical Block Addresses (LBAs) or Physical Block Addresses (PBAs)) for storing data at the DSD 106. In other implementations, the usage request sent by programmable network switch 102 can request statistical usage data from the DSD 106, such as, for example, an indication of a write frequency or command performance level for the DSD 106. For example, programmable network switch 102 may be configured to send a Self-Monitoring, Analysis Reporting Technology (SMART) request to a DSD 106 to obtain usage data. Such usage data may be collected by a controller of the DSD 106.

In the example of FIG. 1B, each of DSDs 106A, 106B, 106C, and 106D return an indication of available logical addresses for storing data (e.g., Ad(a) in FIG. 1B). Programmable network switch 102 receives the indication of available addresses and updates usage data 16B, which associates an identifier for each DSD, such as a network address for the DSD, with a percentage or relative usage of the DSD. For example, usage data 16B indicates that DSD 106A has a state of 90%, which can mean that 90% of the total capacity of DSD 106A is used, leaving 10% of the total storage capacity for storing new data. In contrast, DSD 106B has only 10% of its storage capacity used, leaving 90% of the total storage capacity for storing new data.

In this regard, programmable network switch 102 may perform load balancing for new write commands received from clients 104 by determining to send a higher percentage or amount of new write commands to DSD 106B than to DSD 106A, since DSD 106B has more of its relative storage capacity available. As will be appreciated by those of ordinary skill in the art, usage data 16B may include different information than that shown in FIG. 1B. For example, other implementations may include an address range for the available storage capacity of each DSD 106 or may group certain DSDs together as a single storage space, such as by grouping DSDs 106C and 106D together as a total storage space.

In addition, programmable network switch 102 maintains address mapping 18, which assigns logical address ranges to available storage space or capacity in DSDs 106. As shown in the example of FIG. 1B, logical address range u to (v-1) is assigned to the available storage capacity of DSDs 106A and 106D. In this regard, DSD 106A serves as a primary location for storing data within the logical address range of u to (v-1), while DSD 106D serves as a secondary location or backup location for storing a copy of the data that is stored in DSD 106A. In the example of FIG. 1B, address mapping 18 assigns or maps logical addresses within the range of v to (w-1) to the available storage capacity of DSD 106B as a primary location, and to DSD 106C as a secondary location. Logical address range w to (x-1) is mapped or assigned to the available storage capacity of DSD 106C as a primary location, and to DSD 106B as a secondary location. Logical address range x to y is mapped or assigned to the available storage capacity of DSD 106D as a primary location, and to DSD 106A as a secondary location.

By using ranges of logical addresses in mapping 18, it is ordinarily possible to reduce the storage space needed for mapping 18. In some implementations, mapping 18 may be combined with usage data 16. In this regard, the information shown in mapping 18 of FIG. 1B may differ in other implementations. For example, mapping 18 may not include a secondary storage location for automatic in-line backups or may indicate a port, rather than a DSD, such as by indicating a port number. In some implementations, programmable network switch may also use mapping 18 to represent a total available storage capacity of DSDs 106A, 106B, 106C, and 106D to clients 104 as a single DSD.

Programmable network switch 102 may periodically update one or both of usage data 16B and mapping 18 based on responses to the usage requests sent to DSDs 106. For example, programmable network switch 102 may send usage requests to DSDs 106 each hour to obtain updated usage data from the DSDs, and may then update usage data 16B and/or mapping 18 as needed. The address ranges assigned to respective DSDs 106 or ports 110 may be reduced as storage space in the DSDs 106 is consumed. In some implementations, programmable network switch 102 may update usage data 16 and/or mapping 18 based on write commands sent to DSDs 106. The usage data requested from DSDs 106 may then serve as a periodic correction or adjustment to usage data 16 and/or mapping 18 as needed.

As will be appreciated by those of ordinary skill in the art, other implementations of system 100 may include a different arrangement than shown in FIG. 1B. For example, in some implementations, mapping 18 may be stored at hardware accelerator 108, or the state information shown in usage data 16B may be replaced by the logical address ranges indicated in mapping 18, which can indicate an available storage capacity for respective DSDs or ports for purposes of load balancing.

Example Processes

Figure 2:
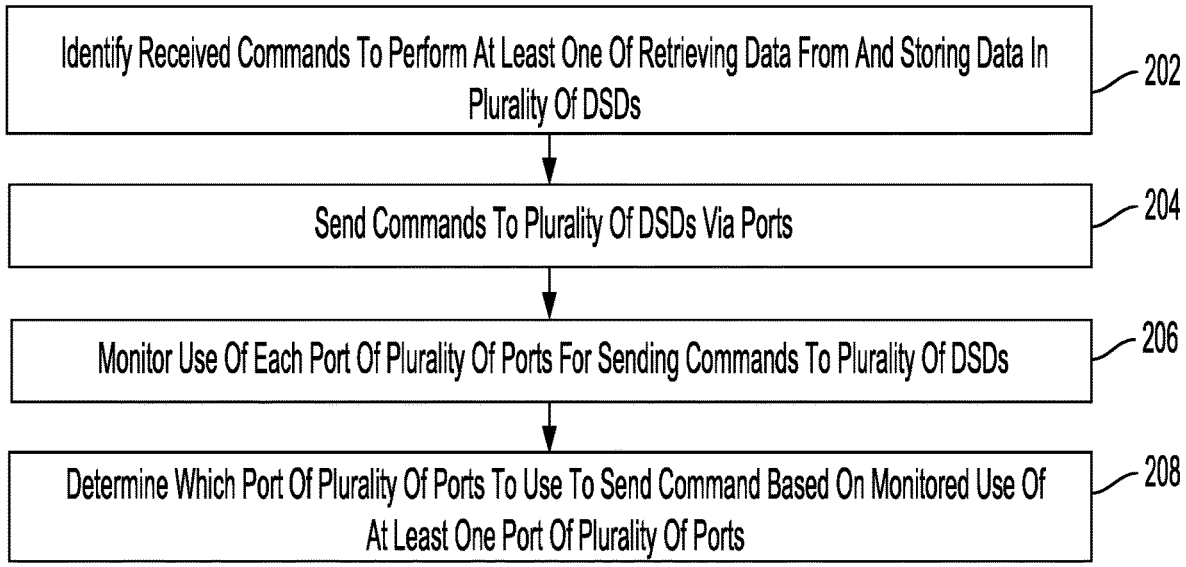
FIG. 2 is a flowchart for an in-line port monitoring process according to one or more embodiments.

FIG. 2 is a flowchart for an in-line port monitoring process according to one or more embodiments. The process of FIG. 2 can be performed by, for example, programmable network switch 102 executing usage module 10.

In block 202, the programmable network switch identifies certain packets as received commands to perform at least one of retrieving data from and storing data in a plurality of DSDs. As in the examples of FIGS. 1A and 1B discussed above, the DSDs communicate with the programmable network switch via ports of the programmable network switch, such as ports 1106, 1107, and 1108. The received commands may come from clients, such as clients 104 in FIGS. 1A and 1B.

In some implementations, circuitry of the programmable network switch may use at least one pipeline including a packet parser to parse received packets to determine whether the received messages are commands or a particular type of command, such as a write command to store data or a read command to retrieve data. In such implementations, a parser may extract instructions from a payload of the message, and a processing stage of a pipeline of the programmable network switch may compare the extracted instructions to information in a match-action table to identify the received message as a command or as a particular type of command.

In block 204, the programmable network switch sends the received commands using a deparser to the plurality of DSDs via ports of the programmable network switch. The commands can include read commands to retrieve data from the DSDs and write commands to store data in the DSDs. The commands can be sent directly to the DSDs or may be sent to a switch or hub that may further route the commands to a specific DSD in a group of DSDs that communicate with the programmable network switch via a single port, as with the example of switch 112 discussed above with respect to FIG. 1A. In sending the commands, a traffic manager of the programmable network switch may identify a port to use based on a network address specified in the received command or based on logical addresses for the data included in the command. In this regard, one or more match-action stages may be used to match an extracted address with a port identifier.

In block 206, the programmable network switch monitors the use of each port of the plurality of ports for sending commands to the plurality of DSDs. The monitoring can include, for example, keeping track of a number of write and/or read commands sent via a particular port or to a particular DSD. In some implementations, only the write commands may be monitored, as opposed to both read commands and write commands. In such implementations, the load balancing among the DSDs or ports may be based upon evenly distributing new write commands among the DSDs or ports. In other implementations, the overall number of read and write commands may be tracked to more evenly distribute both types of commands among the DSDs or ports.

In yet other implementations, the monitored use of each port can include requesting a current usage of one or more DSDs that communicate via the port. As discussed above with reference to the example of FIG. 1B, the current usage can indicate an available storage capacity of the one or more DSDs in communication with the programmable network switch via the port. The programmable network switch in block 206 of FIG. 2 may then update usage data (e.g., usage data 16B in FIG. 1B) based on a current usage received from the one or more DSDs.

In block 208, the programmable network switch determines which port of the plurality of ports to send a received command based on the monitored use of at least one port of the plurality of ports. In some implementations, the programmable network switch may send commands to DSDs indicated in the command for an initial period, such as for a few days, before redirecting commands to DSDs that may differ from those indicated in the commands. In cases where the programmable network switch redirects the command to a different DSD than indicated by the requesting client, the programmable network switch may indicate that the data was stored at a different DSD using a command completion message. In other implementations, the redirecting of a command to a different DSD may be hidden or transparent to the requesting client.

In some implementations, the programmable network switch may assign a logical address to data to be stored for write commands. A mapping, such as mapping 18 in FIG. 1B, may be used by the programmable network switch to assign a logical address to data for a write command sent to a DSD. The programmable network switch may then provide the assigned logical address to the client when sending a write completion message back to the client.

Figure 3:
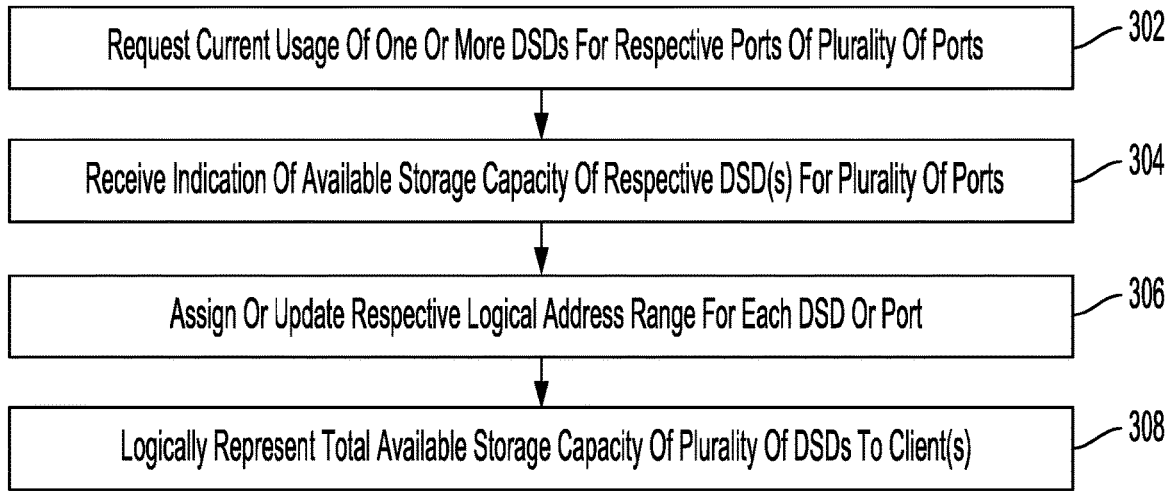
FIG. 3 is a flowchart for a logical address mapping process according to one or more embodiments.

FIG. 3 is a flowchart for a logical address mapping process according to one or more embodiments. The process of FIG. 3 can be performed by, for example, programmable network switch 102 executing usage module 10.

In block 302, the programmable network switch requests a current usage of one or more DSDs for respective ports of a plurality of ports. The requested usage in some implementations can include, for example, an available storage capacity, available addresses for storing data, or other usage information, such as a number of write operations performed.

In block 304, the programmable network switch receives an indication of the available storage capacity of the respective one or more DSDs for the plurality of ports. As discussed above, some ports may be used to communicate with more than one DSD, as in the case of DSDs 106C and 106D in FIG. 1B. In such cases, the programmable network switch in block 304 may receive an overall indication of available storage capacity for the DSDs or may receive individualized indications of available storage capacity depending on whether a storage controller or server between the DSDs and the programmable network switch aggregates the available storage capacities of the individual DSDs.

In block 306, the programmable network switch assigns or updates a respective logical address range for each DSD or for each port. In the example of FIG. 1B discussed above, this can include updating or initially assigning the logical address ranges shown in mapping 18 to DSDs 106A to 106D. The logical address ranges represent an available storage capacity of the DSDs. The use of logical address ranges can also help conserve storage space for the mapping.

In block 308, the programmable network switch may optionally represent a total available storage capacity of the DSDs to one or more clients. In some cases, the programmable network switch may logically represent the DSDs as a single DSD. For example, the programmable network switch may provide one or more clients with the entire logical address range for all the DSDs, such that the programmable network switch appears as a DSD to a client with the logical addresses assigned to the available storage capacities of the DSDs.

Figure 4:
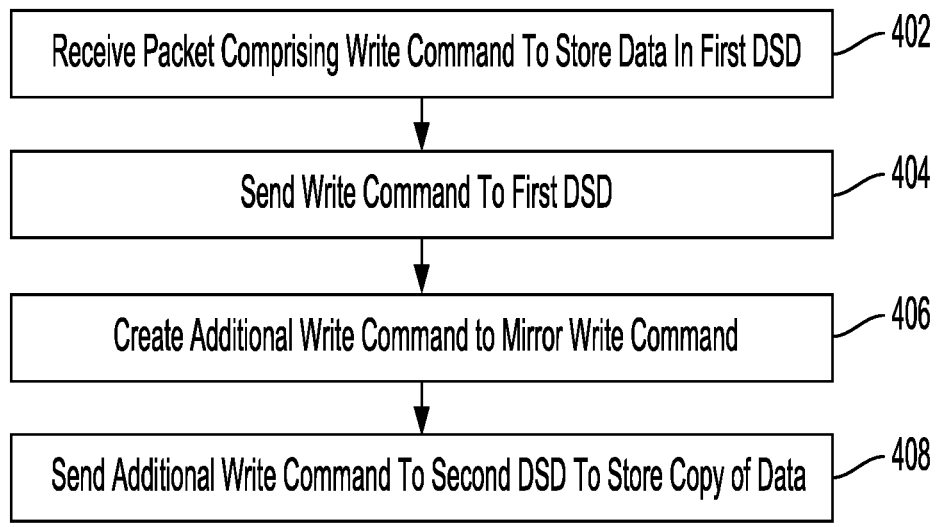
FIG. 4 is a flowchart for an in-line data backup process according to one or more embodiments.

FIG. 4 is a flowchart for an in-line data backup process according to one or more embodiments. The process of FIG. 4 can be performed by, for example, programmable network switch 102 executing backup module 14.

In block 402, the programmable network switch receives a packet comprising a write command to store data in a first DSD of a plurality of DSDs in communication with the programmable network switch. In some implementations, circuitry of the programmable network switch may determine that an incoming message or packet is a write command by parsing contents of a payload of the message or packet to identify instructions for storing data. As discussed above, a processing stage of the programmable network switch may use a match-action table to identify the message or packet as a write command to store data in a DSD.

In block 404, the programmable network switch sends the write command using a deparser to the first DSD via a port of the programmable network switch. The programmable network switch in some implementations may determine which port to send the write command with usage data, such as usage data 16A or 16B in FIGS. 1A and 1B discussed above. In such implementations, the programmable network switch may load balance the storage of data or the sending of commands among the DSDs in communication with the programmable network switch so as to send more commands to DSDs that have a lower monitored usage in terms of an available storage capacity or an amount of commands. In other implementations, the programmable network switch may determine which port or DSD should receive the write command based on a destination address included in the write command, such as a network address for the first DSD.

In block 406, the programmable network switch creates an additional write command to mirror the first write command. For example, the programmable network switch may be configured to send the additional write command to a different DSD for each write command destined for a particular DSD, or the programmable network switch may be configured to send the additional write command to a different DSD for certain data that has been flagged for backup by a client sending the write command. In this regard, a particular logical address range, a priority or backup indication in the write command, or write commands received from a particular client may be backed up on a different DSD. With reference to the example of FIG. 1B discussed above, programmable network switch 102 mirrors or sends additional write commands to a secondary DSD as indicated in mapping 18.

In block 408, the programmable network switch sends the additional write command to a second DSD of the plurality of DSDs in communication with the programmable network switch. The additional write command allows for a backup of the data from the first write command to be automatically stored at the second DSD. This can prove useful for QoS purposes where read commands may be sent to both the first and second DSDs to retrieve the data to improve a read command response time. In other cases, the programmable network switch may only send an additional read command for the data in cases where there is an error in retrieving the data from the first DSD or if a timeout value has been reached after sending the first read command. In yet other implementations, the storage of a copy of the data at the second DSD can provide for later load balancing of commands where a read command for the data can be sent to the second DSD, as opposed to the first DSD, which may have a higher usage in terms of commands sent to the first DSD relative to the second DSD. An indication of a copy of the data being stored at the second DSD may be stored in a data structure, such as mapping 18 in FIG. 1B.

In some implementations, the in-line backup process of FIG. 4 can be transparent or hidden from the client that sent the write command. In other implementations, the programmable network switch may indicate to the client that a copy of the data was stored in a backup location, such as with a write completion message returned to the client.

Figure 5:
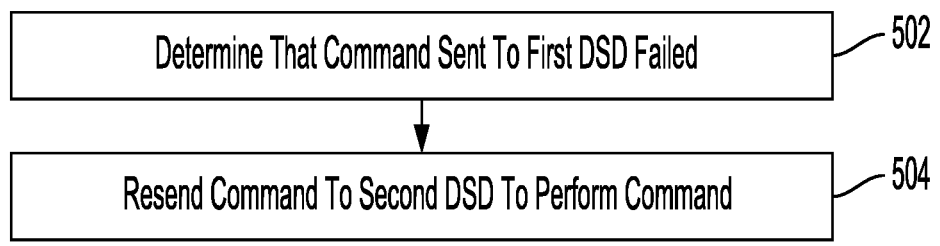
FIG. 5 is a flowchart for an in-line failure handling process according to one or more embodiments.

FIG. 5 is a flowchart for an in-line failure handling process according to one or more embodiments. The process of FIG. 5 may be performed by, for example, programmable network switch 102 executing failure handler 12.

In block 502, the programmable network switch determines that a command sent to a first DSD has failed. The determination in block 502 may be made, for example, by a timeout value being exceeded for the command, such as where a write completion has not been received from the DSD for a write command within a period of time, or where data has not been received from the DSD for a read command within a period of time. In other cases, the determination in block 502 may be made after an error message is received from the DSD. Circuitry of the programmable network switch, or optional circuitry of a hardware accelerator, may be configured to identify error codes or messages received from the DSD and/or to match returned write completion messages or returned data for read commands with commands previously sent to the DSD from the programmable network switch.

In block 504, the programmable network switch resends the command to a second DSD to perform the command. The programmable network switch may access a data structure, such as mapping 18 in the example of FIG. 1B, to determine which DSD should receive the resent command. The identification of the second DSD may be made based on a logical address included in the command that falls within a particular logical address range assigned by the programmable network switch, or the identification of the second DSD may be made based on the first DSD or its port. For example, with reference to the example of FIG. 1B, the failure of a command to DSD 106A would cause programmable network switch 102 to resend the command to DSD 106D, since mapping 18 indicates that DSD 106D is the secondary storage location for DSD 106A.

In some implementations, the in-line failure handling process of FIG. 5 can be transparent or hidden from the client that sent the command. In other implementations, the programmable network switch may indicate that the data was retrieved from or stored in the second DSD.

As discussed above, the foregoing use of a centralized programmable network switch to perform in-line data operations, such as load balancing, QoS operations, backups, and failure handling, can ordinarily improve the efficiency of such operations in terms of time, processing resources, and network traffic. In addition, the use of a programmable network switch can also allow for a variety of different communication protocols among devices in the system, such as among different types of DSDs, clients, and/or hardware accelerators.

OTHER EMBODIMENTS

Those of ordinary skill in the art will appreciate that the various illustrative logical blocks, modules, and processes described in connection with the examples disclosed herein may be implemented as electronic hardware, software, or combinations of both. Furthermore, the foregoing processes can be embodied on a computer readable medium which causes a processor, controller, or other circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A programmable network switch, comprising:
    a plurality of ports for communication with a plurality of Data Storage Devices (DSDs);
    at least one pipeline comprising a packet parser configured to parse packets received by the programmable network switch; and
    circuitry configured to:
        receive packets using the at least one pipeline, the packets comprising write commands to store data in the plurality of DSDs;
        send the write commands to the plurality of DSDs via the plurality of ports;
        monitor use of each port of the plurality of ports for sending the write commands to the plurality of DSDs; and
        update a logical address mapping based on the monitored use of one or more ports of the plurality of ports, wherein the logical address mapping assigns logical addresses for data to an available storage capacity of the plurality of DSDs.

2. The programmable network switch of claim 1, wherein the circuitry is further configured to determine which port of the plurality of ports to use to send a write command based on the monitored use of at least one port of the plurality of ports.

3. The programmable network switch of claim 1, wherein the circuitry is further configured to identify the received write commands from among a plurality of packets received by the programmable network switch by using the at least one pipeline to parse a payload of each received write command.

4. The programmable network switch of claim 1, wherein the circuitry is further configured to monitor use of a port of the plurality of ports by requesting a current usage of one or more DSDs of the plurality of DSDs that communicate via the port, and wherein the current usage indicates an available storage capacity of the one or more DSDs.

5. The programmable network switch of claim 4, wherein the circuitry is further configured to update the logical address mapping based on the current usage.

6. The programmable network switch of claim 1, wherein the circuitry is further configured to:
    receive an indication of a storage capacity available for storing data in one or more DSDs that communicate with the programmable network switch via a port of the plurality of ports; and
    assign a logical address range to the port or to the one or more DSDs, the logical address range representing an available storage capacity of the one or more DSDs.

7. The programmable network switch of claim 1, wherein the circuitry is further configured to logically represent a total available storage capacity of the plurality of DSDs to at least one client in communication with the programmable network switch.

8. The programmable network switch of claim 1, wherein the circuitry is further configured to:
    receive a packet comprising a write command to store data in a first DSD of the plurality of DSDs;
    send the write command to the first DSD; and
    mirror the write command by sending an additional write command to a second DSD of the plurality of DSDs to store a copy of the data.

9. The programmable network switch of claim 1, wherein at least one port of the plurality of ports is connected to multiple DSDs of the plurality of DSDs.

10. The programmable network switch of claim 1, wherein the circuitry is further configured to:
  determine that a write command or a read command sent to a first DSD of the plurality of DSDs has failed or timed-out; and
  resend the write command or the read command to a second DSD of the plurality of DSDs to perform the write command or the read command.

11. A method of operating a programmable network switch, the method comprising:
  receiving packets using at least one pipeline of the programmable network switch, the packets comprising commands to perform at least one of retrieving data from and storing data in a plurality of DSDs in communication with the programmable network switch;
  sending the commands to the plurality of DSDs via a plurality of ports of the programmable network switch;
  monitoring use of each port of the plurality of ports for sending the commands to the plurality of DSDs;
  determining at the programmable network switch that a read command sent to a first DSD of the plurality of DSDs has timed-out; and
  in response to determining that the read command timed-out, resending the read command to a second DSD of the plurality of DSDs to perform the read command.

12. The method of claim 11, further comprising determining which port of the plurality of ports to use to send a command based on the monitored use of at least one port of the plurality of ports.

13. The method of claim 11, further comprising identifying, from among a plurality of packets received by the programmable network switch, the received commands as commands to perform at least one of retrieving data and storing data by using the at least one pipeline to parse a payload of each received command.

14. The method of claim 11, wherein monitoring use of a port of the plurality of ports includes requesting a current usage of one or more DSDs in communication with the programmable network switch via the port, and wherein the current usage indicates an available storage capacity of the one or more DSDs.

15. The method of claim 14, further comprising updating a logical address mapping based on the current usage.

16. The method of claim 11, further comprising:
  receiving an indication of a storage capacity available for storing data in one or more DSDs that communicate with the programmable network switch via a port of the plurality of ports; and
  assigning a logical address range to the port or to the one or more DSDs, the logical address range representing an available storage capacity of the one or more DSDs.

17. The method of claim 11, further comprising:
  receiving a packet comprising a write command to store data in a first DSD of the plurality of DSDs;
  sending the write command to the first DSD;
  creating an additional write command at the programmable network switch to mirror the write command; and
  sending the additional write command to a second DSD of the plurality of DSDs to store a copy of the data.

18. The method of claim 11, further comprising:
  determining at the programmable network switch that a write command sent to a first DSD of the plurality of DSDs has failed or timed-out; and
  in response to determining that the write command failed or timed-out, resending the write command to a second DSD of the plurality of DSDs to perform the write command.

19. The method of claim 11, further comprising logically representing, by the programmable network switch, a total available storage capacity of the plurality of DSDs to at least one client in communication with the programmable network switch.

20. A non-transitory computer readable medium storing computer-executable instructions, wherein when the computer-executable instructions are executed by circuitry of a programmable network switch, the computer-executable instructions cause the circuitry to:
  receive packets using at least one pipeline of the programmable network switch, the packets comprising write commands to store data in a plurality of DSDs in communication with the programmable network switch;
  send the write commands to the plurality of DSDs via a plurality of ports of the programmable network switch;
  monitor use of each port of the plurality of ports for sending the write commands to the plurality of DSDs; and
  update a logical address mapping based on the monitored use of one or more ports of the plurality of ports, wherein the logical address mapping assigns logical addresses for data to an available storage capacity of the plurality of DSDs.

* * * * *